D. R. BOWEN AND C. F. SCHNUCK.
MACHINE FOR TREATING RUBBER AND SIMILAR MATERIAL.
APPLICATION FILED DEC. 20, 1917.

1,355,305.

Patented Oct. 12, 1920.
6 SHEETS—SHEET 2.

D. R. BOWEN AND C. F. SCHNUCK.
MACHINE FOR TREATING RUBBER AND SIMILAR MATERIAL.
APPLICATION FILED DEC. 20, 1917.

1,355,305.

Patented Oct. 12, 1920.
6 SHEETS—SHEET 3.

INVENTORS
D. R. Bowen and C. F. Schnuck,
BY
ATTORNEY

D. R. BOWEN AND C. F. SCHNUCK.
MACHINE FOR TREATING RUBBER AND SIMILAR MATERIAL.
APPLICATION FILED DEC. 20, 1917.

1,355,305.

Patented Oct. 12, 1920.
6 SHEETS—SHEET 4.

INVENTORS

UNITED STATES PATENT OFFICE.

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

MACHINE FOR TREATING RUBBER AND SIMILAR MATERIAL.

1,355,305.     Specification of Letters Patent.     Patented Oct. 12, 1920.

Application filed December 20, 1917. Serial No. 208,135.

*To all whom it may concern:*

Be it known that we, DAVID R. BOWEN and CARL F. SCHNUCK, both citizens of the United States, and both residing in Ansonia, county of New Haven, and State of Connecticut, have invented certain new and useful Improvements in Machines for Treating Rubber and Similar Material, of which the following is a full, clear, and exact description.

This invention relates to machines for treating rubber and similar heavy plastic material, and it pertains especially to machines for mixing, masticating, working or kneading rubber which is to be used for various industrial purposes. The invention pertains more particularly to machines of the type shown in our application, Serial No. 191,413. In that application there is described a rubber mixer or like machine in which the rubber, which is usually in fairly large chunks, is mixed with filling or coloring material, such as lamp-black, by an extrusion process, for which purpose the batch of material is worked back and forth in a mixing or working chamber, said mixing or working chamber being provided intermediate of its ends with means presenting a constriction or extrusion space therein, through which the material is forced alternately in opposite directions by blades on a rotor working in the chamber. When the material has been sufficiently acted on by the rotor to give the mass the required homogeneity, the batch is discharged from the lower portion of the chamber. In the machine shown in the prior application, discharge is effected by lowering the entire lower portion of the chamber wall or casing, which lower portion is for this purpose hinged to the main part of the casing at one side of the latter.

The present improvements relate more especially to the means for discharging the working chamber in a very simple and efficient manner.

One object of the invention is to provide a rubber mixing machine in which it is unnecessary to move the entire lower portion of the casing, and to this end the discharge is effected by opening a relatively small portion of the casing wall at a point in line with the extrusion rib or the like which is provided on the main part of the chamber wall.

Another object of the invention is to provide a rubber mixer in which the discharge can be effected by a shifting movement imparted to an extrusion rib or the like.

Another object of the invention is to provide a rubber mixer or like machine, in which the casing is provided with two discharge sections mounted on opposite sides respectively of the longitudinal axis of the working chamber, and adapted to move simultaneously but oppositely from the closed position to the discharging position and vice versa.

Still another object of the invention is to improve the construction and increase the convenience of the discharge means in a machine of the general character stated, particularly with a view to the expeditious discharge of the machine with a minimum amount of labor on the part of the operator.

To these and other ends, the invention consists in the novel features and combinations of parts to be hereinafter described and claimed.

In the accompanying drawings,

Fig. 2ᴬ is a detail of the rotor;

We have shown our improvements applied to a rubber mixer which is very similar in its general features to that disclosed in our previous application, Serial No. 191,413, previously mentioned, but it will be understood from the following description that the type of the machine may be considerably varied without departure from the scope of the invention.

In the embodiment shown, a working or mixing chamber 20, in the form of a single cylinder, is supported between suitable pedestals or end frames 21 standing on the floor and having heads 22 closing the respective cylinder ends. In the form shown, the cylindrical working chamber is horizontally arranged between the pedestals, and is provided interiorly with a central mixing element or rotor 23, having a shaft 24 with bearings in the respective end frames. The shaft 24 may be rotated by any suitable means, which we have not considered it necessary to illustrate. The working cylinder and rotor are quite similar to those described and claimed in our prior application, the working chamber being constricted intermediate of its ends by the transverse constriction or rib, and the rotor having blades 25 at opposite sides of the rib adapted to mash the plastic material against the side wall of the cylinder 20 and to extrude such material alternately in opposite directions (generally longitudinally of the cylinder) through the restricated extrusion space provided by said rib. In the particular form shown, the material to be mixed, which usually consists of fairly large chunks of rubber and filling or coloring material such as lamp-black, is charged into the working chamber 20 from the top, for which purpose a charging stack 26 is provided, having a charging opening 27 at its upper part and a fluid operated follower 28 working in said stack; but the particular means for introducing the charge into the working chamber forms no part of our present invention, which concerns itself primarily with the provision for discharging the material from said chamber.

Figure 1:
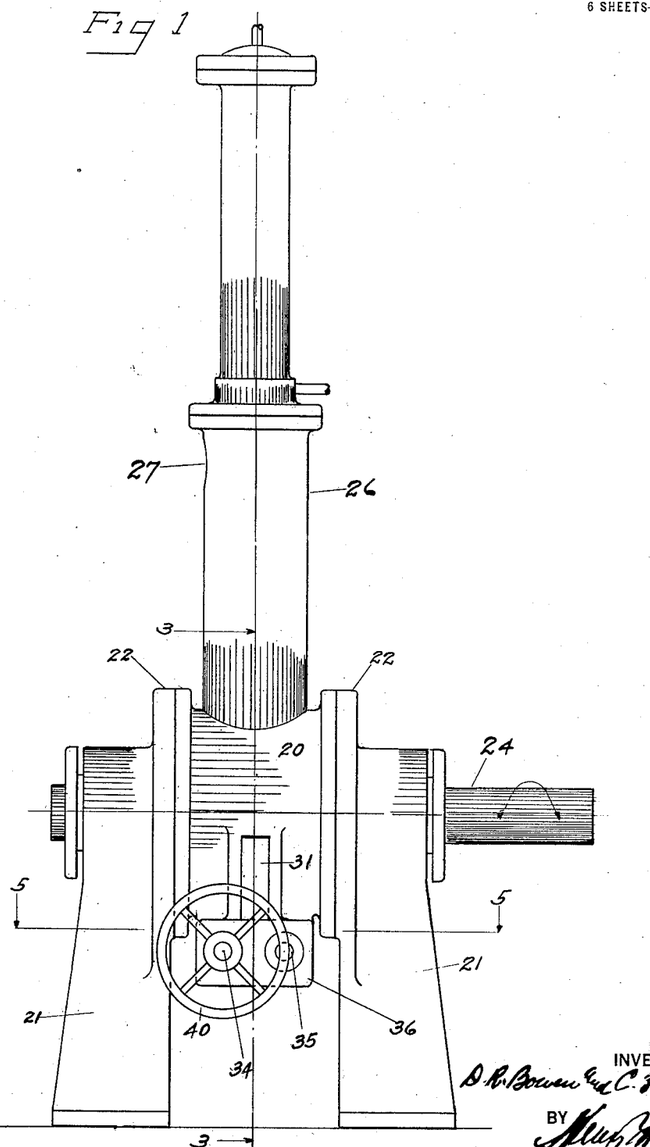
Figure 1 is a front elevation of a rubber mixing machine embodying our improvements.
Figures 2, 2A:
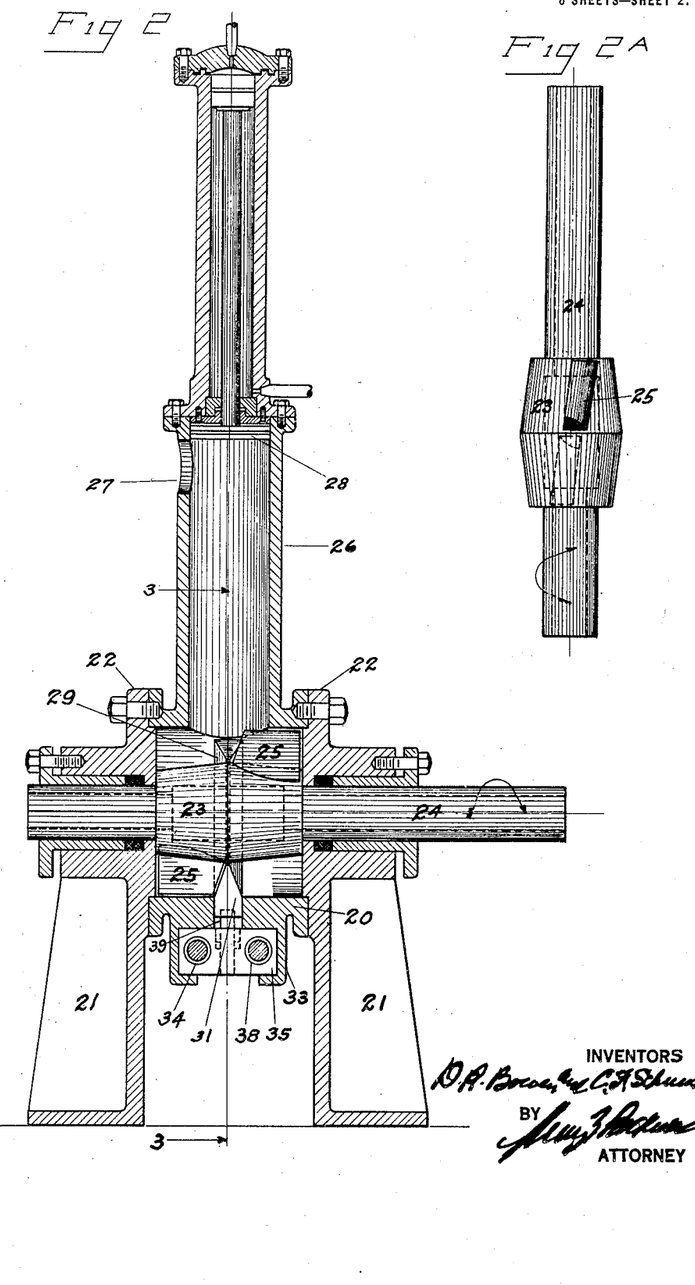
Fig. 2 is a vertical longitudinal section of the machine.
Figure 3:
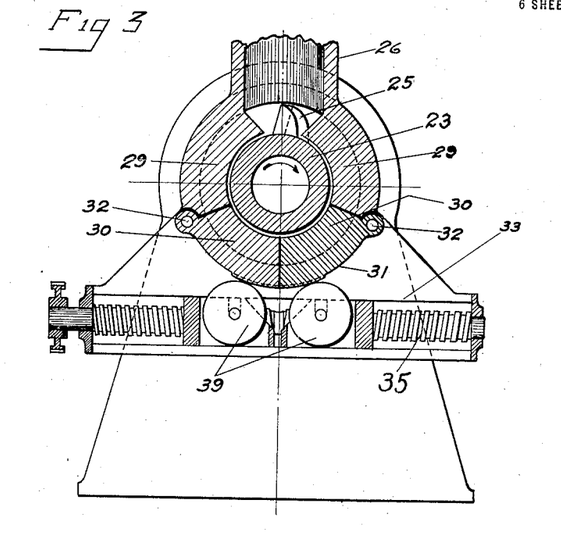
Fig. 3 is a transverse section through the lower part of the machine, with the working chamber closed.
Figure 4:
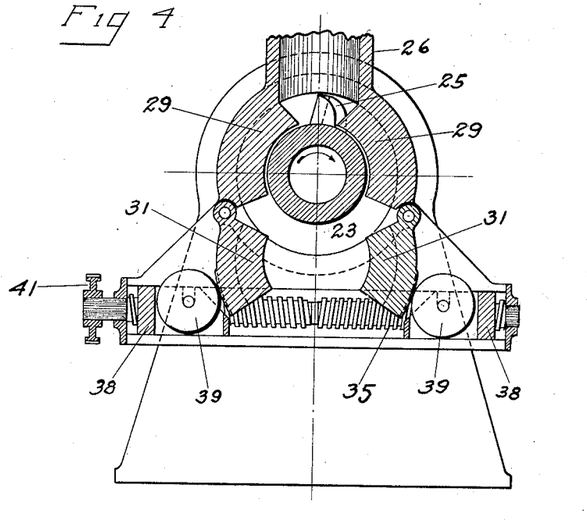
Fig. 4 is a view similar to Fig. 3, but showing the working chamber opened for the discharge of the mixed material.

As shown particularly in Figs. 2, 3 and 4, the extrusion rib, located between the blades in the two end portions of the working chamber, consists of two stationary portions 29 carried by the main part of the working chamber, and two independently movable parts 30, which are located at the lower part of the chamber, and are shiftable relatively to the lower part of the casing for the purpose of discharging the machine. In the example now under discussion, the two fixed rib portions 29 and the two movable rib portions 30 are all in line with each other, so that when the chamber is closed, as shown in Fig. 3, said portions all constitute in effect a single continuous rib which extends transversely of the chamber wall throughout the greater part of its periphery, being interrupted only at a point opposite the charging stack 26; but other arrangements may be made without departing from the scope of the invention. As shown in Fig. 3, the rib portions 29 are integral with the upper main portion of the chamber, while the portions 30 operate in suitable openings 31 in the lower part of the casing and are hinged to the main part of the chamber wall by hinges or pivots 32 located at the respective sides of the chamber. Normally the rib portions 30 hang down in the position shown in Fig. 4 similarly to the jaws of a clam shell bucket, thus providing a discharge space between them substantially in the longitudinal axis of the working chamber, as shown in Fig. 4, through which the material may have free egress when it is desired to discharge the machine. When it is desired to close the working chamber, however, the movable rib portions 30 may be moved into the position shown in Fig. 3, and held in that position by suitable means which we shall now describe.

Figure 5:
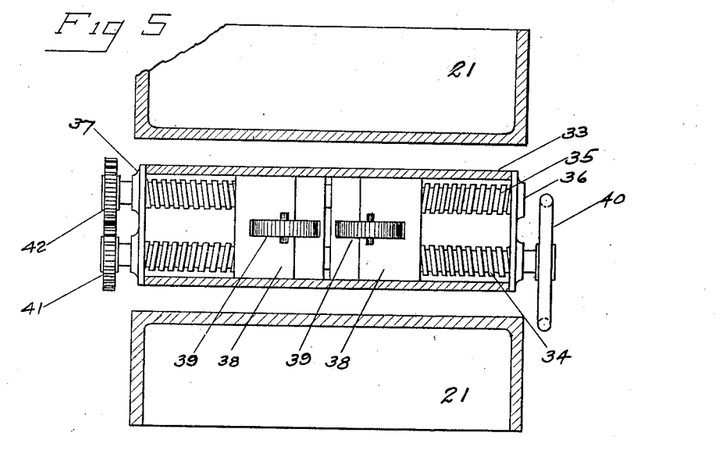
Fig. 5 is a section on line 5—5 of Fig. 1, looking down.

Mounted below and transversely of the working chamber 20 in a yoke 33 integral with the chamber wall are parallel threaded spindles 34, 35. Each spindle has a bearing in one end portion 36 of the yoke and a similar bearing in the opposite end portion 37 thereof. Each spindle is provided on opposite sides respectively of the axis of the working chamber with right and left hand threads engaging blocks 38, having threaded sockets therein engaging the threads of the spindles, so that the blocks may travel toward and away from each other in the manner of nuts, each block being screwed on both spindles, so that the block has no tendency to rotation. The two blocks or nuts are disposed at the respective sides of the longitudinal axis of the working chamber, and each carries at the upper part thereof suitable means for engaging the corresponding rib portion 30. In the particular example illustrated, each block has a roller 39 freely set in the upper portion thereof to engage the corresponding rib portion 30 at the lower part thereof, as shown in Fig. 3. The spindle 34 may be rotated by a hand wheel 40, and from it rotation is imparted to the spindle 35 in the opposite direction by a gear 41 on the opposite end of the spindle 34 from the hand wheel engaging a gear 42 on the spindle 35. The arrangement is such that when the hand wheel 40 is rotated in one direction the threaded halves of the spindles at one side of the working chamber axis pull the corresponding block away from the axis of the chamber, while the other halves of the spindles pull the other block away from the axis of the chamber in the opposite direction; whereas when the hand wheel 40 is turned in the opposite direction, the blocks are moved toward each other back to the position shown in Fig. 5. In the position shown in Fig. 3, the rollers 39 hold the respective rib portions 30 in the closed position, but when the rollers are moved outward to the position shown in Fig. 4, the rib portions 30 swing down by gravity into the open position, so as to discharge the machine at a point in line with the fixed portions 29 of the transverse extrusion rib. In discharging the machine, the fixed portions 29 of the rib act as strippers, which strip the material from the rotor as such material contacts with one or more ends of said rib portions, and the material is thereby caused to drop downward from the rotor in the space between the suspended rib portions 31 and between the two spindles 34, 35 by means of which the movable rib portions are controlled. The discharging material can be readily caught and collected if desired in a receptacle placed below the spindles.

By our improvements a very effective discharge can be obtained from the working chamber at a point intermediate of the ends thereof. It is not necessary to open the entire lower portion of the chamber, and hence the discharging operation is made comparatively easy, as it is a simple matter to release the rib portions 30 so that they will hang down in the discharging position, and to thereafter force them upward into the closed position by the operation of the spindles and rollers when the discharging operation has been completed. In moving the rib portions 30 back to the closed position, the rollers 39 in being forced inwardly toward each other exert a camming action on the corresponding rib portions, which forces them upward so that their upper edges make tight contact with the lower edges of the fixed rib portions 29, while the lower edges of the rib portions 30 make a good tight contact with each other substantially in a vertical plane passing through the center of the working chamber, as shown in Fig. 3. The discharging operation can be effected with particular convenience owing to the fact that it is not necessary to release any special fastening for the closure members, and that when the rollers 39 are moved out of the way, which can be very readily done, the swinging closure members move by gravity into a discharging position. The discharge also takes place in a substantially vertical direction between the pedestals, and while sufficiently free to empty the machine expeditiously, such discharge is sufficiently confined or localized as to facilitate the collection and disposal of the mixed material.

Figure 6:
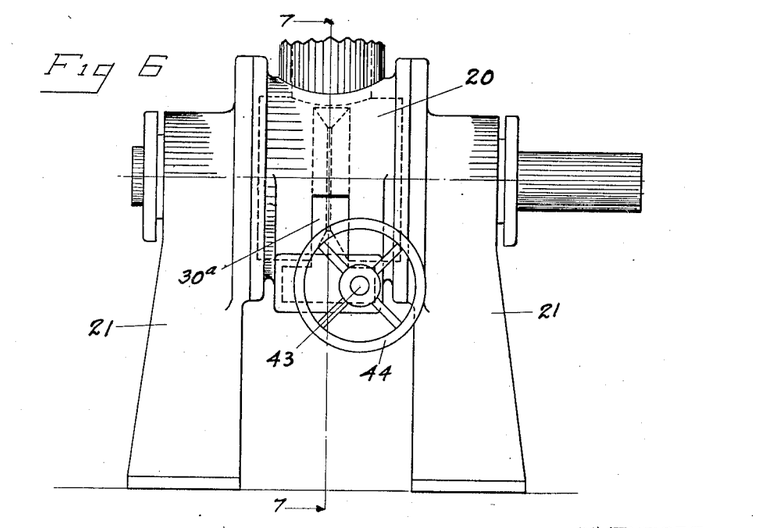
Fig. 6 is a fragmentary front elevation of a machine of slightly modified type.
Figure 7:
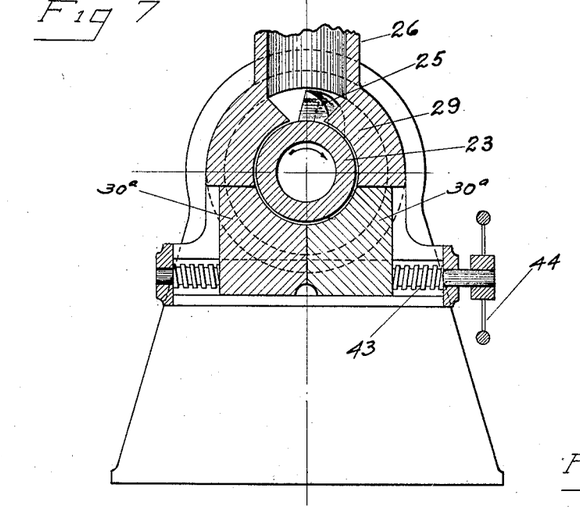
Fig. 7 is a transverse section of the machine shown in Fig. 6, with the working chamber closed.
Figure 8:
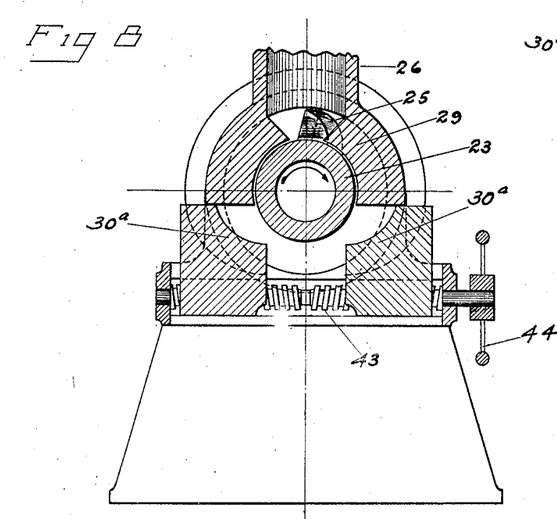
Fig. 8 is a view similar to Fig. 7, but showing the working chamber opened.
Figure 9:
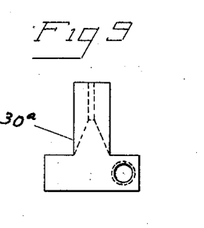
Fig. 9 is a detail of one of the slide blocks.

In the form shown in Figs. 6, 7 and 8, the movable rib members 30ª are of the sliding instead of the swinging type. These rib portions are mounted to slide horizontally toward and away from each other in suitable guide grooves in the yoke portion of the casing, and in this instance they are positively actuated in both directions, by a threaded spindle 43 directly engaging threaded sockets in said rib members. The spindle 43 is operated by a hand wheel 44.

Figure 10:
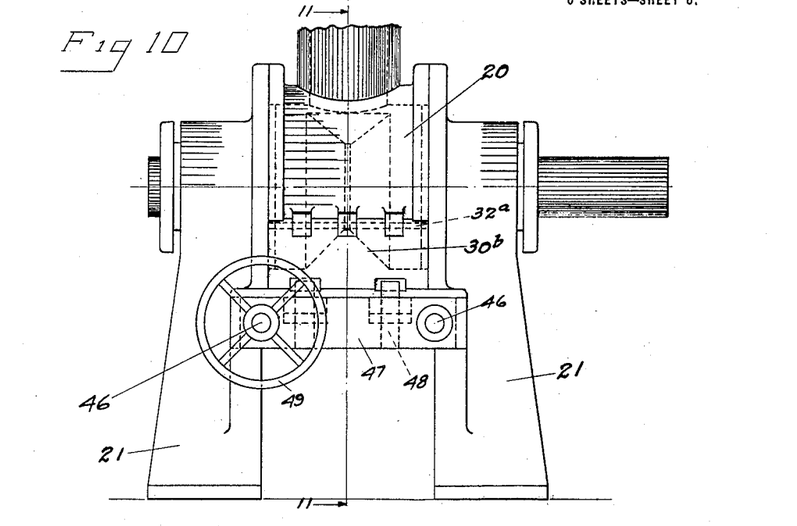
Fig. 10 is a fragmentary front elevation of a still further modified type of the machine.
Figure 11:
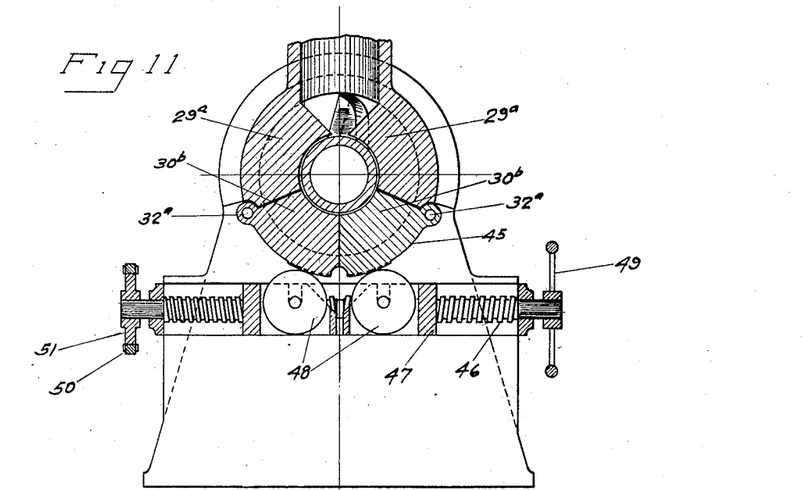
Fig. 11 is a transverse section of the machine shown in Fig. 10.
Figure 12:
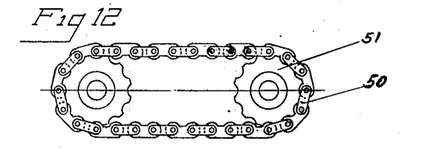
Fig. 12 is a detail of the machine shown in Fig. 10.

In the form shown in Figs. 10, 11 and 12, the movable rib sections 30ᵇ, which are swingingly mounted by pivots 32ª as in the form first described, are carried by casing sections 45 which are of greater length than the width of the rib portions, and in this instance, extend throughout the length of the working cylinder. The hinged casing sections 45 carrying the rib portions 30ᵇ are actuated by parallel threaded spindles 46 carrying traveling blocks or nuts 47 and rollers 48 corresponding in function to the blocks and rollers previously described. One of the spindles carries a hand wheel 49 at the front of the machine, and at the back of the machine the two spindles are interconnected for similar rotary movement by a chain 50 running over sprockets 51 fixed to the respective spindles.

Various changes may be made in the details of the construction without departing from the scope of our invention as defined in the claims. It will be understood, of course, that we do not limit ourselves to a rubber mixer or like machine in which the working chamber is charged from the top, for changes in this and other respects may be made without digressing from the scope of our inventive idea.

We do not claim broadly herein a rubber mixing machine having a working chamber with an intermediate extrusion rib, and a rotor having blades at opposite sides of said rib, as claimed in our application, Serial No. 191,413 previously identified.

Furthermore, we do not claim specifically herein the combination of a working chamber having a swinging closure, cam members movable into engagement with said closure at different points in its length, to force it into the closed position, and means including interconnected threaded spindles for operating said cam members simultaneously, as such combination is claimed in our application, Serial No. 310,020.

What we claim is:—

1. In a rubber mixer or like machine, a working chamber, an extrusion member formed separately from the wall of said chamber, a rotor to coöperate with said extrusion member, and means for shifting the extrusion member relatively to the adjacent part of the chamber for discharging the machine.

2. In a rubber mixer or like machine, a working chamber, a separately formed extrusion rib on the wall of said chamber, and a rotor to coöperate with said rib, said rib movable independently of the adjacent part of the chamber for discharging the machine.

3. In a rubber mixer or like machine, a working chamber, a separately formed transverse extrusion rib on the wall of said chamber, a rotor to coöperate with said rib, said rib movable independently of the adjacent part of the chamber for discharging the machine, and means for shifting said rib to discharge the machine.

4. In a rubber mixer or like machine, a working chamber, a mixer element operating therein and journaled in the ends of the chamber, and means for discharging said chamber at a localized point intermediate of its ends.

5. In a rubber mixer or like machine, a horizontally arranged working chamber, a rotor therein having mixing blades for acting on the material in said chamber, and means for discharging said chamber at the under part thereof and at a localized point intermediate of its ends.

6. In a rubber mixer or like machine, a horizontally arranged working chamber, a rotor therein having mixing blades, and means for discharging the working chamber at a point adjacent the center thereof, and for preventing discharge at other points.

7. In a rubber mixer or like machine, a horizontally arranged working cylinder, a rotor therein having mixing blades, an extrusion rib on the cylinder wall intermediate of the ends thereof coöperating with said rotor blades in the extrusion of the material past said rib alternately in opposite directions, and means for discharging said working cylinder at the under portion thereof and at a point substantially in line with said rib and remote from the cylinder ends.

8. In a rubber mixer or like machine, a working chamber, a rotor therein, said rotor having mixing blades and said chamber and rotor in conjunction presenting a restricted space through which the material is extruded lengthwise of the rotor axis by said blades, and means for discharging said chamber in line with said extrusion space and remote from the working chamber ends.

9. In a rubber mixer or like machine, a working chamber, a rotor therein having a mixing blade or blades, said rotor and chamber presenting in conjunction a restricted extrusion space for the material, and said chamber having a discharge opening in line with and communicating with said extrusion space.

10. In a rubber mixer or like machine, a working chamber, a rotor therein, said rotor and chamber presenting in conjunction an extrusion space arranged generally transversely to the rotor axis, and said chamber having a discharge opening in line with and communicating with said extrusion space.

11. In a rubber mixer or like machine, a working chamber, a rotor therein having blades, one of said parts having an extrusion rib intermediate of the ends of the chamber, and said chamber having a discharge opening in line with said extrusion rib.

12. In a rubber mixer or like machine, a working chamber, a bladed rotor therein one of said parts having a transverse extrusion rib intermediate of the ends of the chamber, said chamber having a discharge opening at the lower portion thereof localized so as to be in substantial alinement with said rib, and means for controlling said opening.

13. In a rubber mixer or like machine, a working chamber having a transverse extrusion rib intermediate of the ends thereof, a rotor in said chamber having blades at the respective sides of the extrusion rib, said chamber having a discharge opening in the lower portion thereof localized so as to be in substantial alinement with said rib, and means for controlling said opening.

14. In a rubber mixer or like machine, a bladed rotor, and a working chamber in which said rotor operates, having an extrusion rib with two fixed sections and two movable sections.

15. In a rubber mixer or like machine, a bladed rotor, and a mixing chamber in which said rotor operates having an extrusion rib with two movable sections.

16. In a rubber mixer or like machine, a bladed rotor, and a mixing chamber in which said rotor operates, having an intermediate extrusion rib with two movable sections for discharging the machine.

17. In a machine of the character described, a bladed rotor, a mixing chamber, and a rib in the mixing chamber coöperating with the rotor and having two relatively movable portions at the lower part of said chamber for discharging the machine.

18. In a rubber mixer or like machine, a horizontally arranged working chamber, a rotor therein, an extrusion rib portion on the chamber wall at the upper part thereof, a second extrusion rib portion on the chamber wall at the lower part of the chamber in line with said first portion, and means for operating said second portion individually to discharge the machine.

19. In a rubber mixer or like machine, a working chamber having a transverse extrusion rib divided into two relatively movable parts on opposite sides respectively of a vertical plane passing through the longitudinal axis of the chamber.

20. In a rubber mixer or like machine a working chamber having a transverse extrusion rib divided into two relatively movable parts on opposite sides respectively of the longitudinal axis of the chamber, said rib parts located at the under portion of the chamber.

21. In a rubber mixer or like machine, a working chamber having a transverse extrusion rib divided into two relatively movable parts on opposite sides respectively of the longitudinal axis of the chamber, said rib parts located at the under portion of the chamber, and meeting each other in a substantially vertical plane at the middle of the chamber.

22. In a rubber mixer or like machine, a working chamber having a plurality of closure members, and means for operating said members simultaneously but in opposite directions.

23. In a rubber mixer or like machine, a working chamber having a plurality of closure members for controlling the discharge of the machine, said members mounted to move transversely of the machine, and means for operating said members simultaneously.

24. In a rubber mixer or like machine, a working chamber having a plurality of members for controlling the discharge of the machine, said members mounted to move independently of each other, and means for operating said members simultaneously but in opposite directions.

25. In a rubber mixer or like machine a working chamber having a plurality of discharge controlling members, and means including threaded spindles for operating said members simultaneously.

26. In a rubber mixer or like machine, a hinged closure adapted to hang down in an open position, and a cam member movable in a straight line in one direction to force said closure to the closed position and movable in the opposite direction to permit said closure to open.

27. In a rubber mixer or like machine, a working chamber having at the under portion thereof separately movable discharge controlling members meeting each other substantially in line with the longitudinal axis of said chamber.

28. In a rubber mixer or like machine, a working chamber having swinging discharge controlling members at the lower portion thereof meeting each other in line with the longitudinal axis of the chamber, and normally hanging in an open position, and means for holding said members in the closed position.

29. In a rubber mixer or like machine, a horizontally arranged working chamber having at the under portion thereof independently movable discharge controlling closure members meeting each other in a plane substantially in line with the axis of the chamber, and means for operating said members simultaneously but in opposite directions.

30. In a rubber mixer or like machine, a horizontally arranged working chamber having at the under portion thereof independently movable discharge controlling closure members meeting each other in a plane substantially in line with the axis of the chamber, and means for operating said members simultaneously but in opposite directions, said operating means including a pair of spaced rotating spindles.

31. In a rubber mixer or like machine, a working chamber having "clam shell" discharge sections at the lower portion thereof normally suspended in the open position, and means for holding said sections in the closed position.

32. In a rubber mixer or like machine, a working chamber having "clam shell" discharge sections at the lower portion thereof normally suspended in the open position, and a common means for raising said sections simultaneously to the closed position and for holding them in that position.

33. In a rubber mixer or like machine, a working chamber having "clam shell" discharge sections at the lower portion thereof normally suspended in the open position, and a common means for raising said sections simultaneously to the closed position and for holding them in that position, said last named means including oppositely movable cam members engaging the lower faces of the respective sections.

34. In a rubber mixer or like machine, a working chamber, a hinged closure therefor adapted to hang down in an open position, a cam member movable toward and away from said closure to control the same and means for operating said cam member.

35. In a rubber mixer or like machine, a bladed rotor, and a working chamber presenting in conjunction with said rotor a restricted extrusion space intermediate of the chamber ends, said chamber having a discharge opening in the wall thereof localized so as to be in communication with said extrusion space and remote from the chamber ends.

36. In a rubber mixer or like machine, a bladed rotor, a working chamber containing the same and presenting in conjunction therewith a relatively narrow extrusion space for the material, said chamber having a relatively narrow discharge opening in line with said extrusion space.

37. In a rubber mixer or like machine, a bladed rotor, a working chamber containing the same and presenting in conjunction therewith a narrow extrusion space, said chamber having a discharge opening in its wall in line with and of substantially the same width as the said extrusion space.

38. In a rubber mixer or like machine, a working chamber, a bladed rotor therein, one of said parts having a transverse extrusion rib intermediate of the ends of the chamber, said chamber having a discharge opening in the wall thereof in line with said rib and of substantially the same width.

39. In a rubber mixer or like machine, a horizontally arranged working cylinder, a bladed rotor therein, one of said parts having a transverse extrusion rib intermediate of the ends of the chamber, said chamber having a discharge opening at the lower portion thereof in line with said rib and of substantially the same width as said rib, and means for controlling said opening.

40. In a rubber mixer or like machine, a working chamber, a rotor therein, and an extrusion rib divided into two relatively movable parts, both movable relatively to the main part of the working chamber.

41. In a rubber mixer or like machine, a working chamber having a swinging closure normally hanging in an open position, a cam for controlling said closure and a spindle for giving said cam a rectilinear movement.

42. In a rubber mixer or like machine, the combination of a chamber, a swinging closure therefor adapted to hang down in an open position, and rectilinearly movable means to close and release said closure.

43. In a rubber mixer or like machine, the combination of a chamber, a swinging closure therefor adapted to hang down in an open position, and rectilinearly movable means to close and release said closure, and a threaded operating spindle for said means.

44. In a rubber mixer or like machine, a chamber, a swinging closure therefor, and means including a rotary threaded operating spindle for locking said closure in the closed position.

45. In a rubber mixer or like machine, a working chamber having a discharge opening at its lower part, a discharge controlling member, and a threaded spindle for giving said discharge controlling member a rectilinear movement.

46. In a rubber mixer or like machine, a working chamber having a discharge opening, a discharge controlling member, means for guiding said member in a straight line transversely of the machine, a threaded spindle for operating said member, and a hand wheel on said spindle.

In witness whereof we have hereunto set our hands on the 11th day of December, 1917.

DAVID R. BOWEN.
CARL F. SCHNUCK.